US008620392B2

(12) United States Patent
Tanaka et al.

(10) Patent No.: US 8,620,392 B2
(45) Date of Patent: Dec. 31, 2013

(54) ELECTRONIC DEVICE CAPABLE OF CONTINUING A TELEPHONE CALL WHEN CHARGING

(71) Applicant: KYOCERA Corporation, Kyoto (JP)

(72) Inventors: Kensaku Tanaka, Kyoto (JP); Daisuke Shimada, Kyoto (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/686,611

(22) Filed: Nov. 27, 2012

(65) Prior Publication Data

US 2013/0137491 A1    May 30, 2013

(30) Foreign Application Priority Data

Nov. 28, 2011 (JP) ................................. 2011-258661

(51) Int. Cl.
*H04M 1/00* (2006.01)
(52) U.S. Cl.
USPC ........ 455/573; 455/420; 455/569.1; 455/572; 455/550.1; 381/151; 381/380; 381/382
(58) Field of Classification Search
USPC ............. 455/572, 114.2, 283, 570, 144, 222, 455/296, 501, 67.13, 573, 574, 455/343.1–343.6, 550.1, 556.2, 90; 381/150, 375, 380; 379/428, 433, 379/338.01, 390.01, 391; 320/107, 123, 320/137, 114
See application file for complete search history.

(56) References Cited

U.S. PATENT DOCUMENTS

| 6,035,221 | A  | * | 3/2000 | Snyder et al. | 455/569.1 |
|-----------|----|----|--------|---------------|-----------|
| 7,206,613 | B2 | * | 4/2007 | Kim et al.    | 455/567   |
| 2005/0185813 | A1 | * | 8/2005 | Sinclair et al. | 381/380 |
| 2008/0137883 | A1 | * | 6/2008 | Araki         | 381/107   |
| 2009/0060231 | A1 | * | 3/2009 | Buroojy       | 381/151   |
| 2012/0214462 | A1 | * | 8/2012 | Chu et al.    | 455/418   |
| 2012/0294463 | A1 | * | 11/2012 | Chu et al.   | 381/150   |

FOREIGN PATENT DOCUMENTS

JP        2011-171798 A        9/2011

* cited by examiner

*Primary Examiner* — Vladimir Magloire
*Assistant Examiner* — Babar Sarwar
(74) *Attorney, Agent, or Firm* — Hoffmann & Baron, LLP (57) ABSTRACT

An object of the present invention is to provide an electronic device capable of continuing a telephone call, even in a case in which power is received from a battery charger while the telephone call is made. The electronic device includes a power receiving unit and a speaker unit. The power receiving unit receives power from the battery charger by electromagnetic waves. The speaker unit outputs sound in a first mode or a second mode. The first mode is a sound output mode when the electronic device is made proximate to a user's ear. The second mode is a sound output mode when the electronic device is separated from the user's ear. In a case in which the power receiving unit is receiving power, the speaker unit outputs sound in the second mode.

8 Claims, 9 Drawing Sheets

ELECTRONIC DEVICE CAPABLE OF CONTINUING A TELEPHONE CALL WHEN CHARGING

This application is based on and claims the benefit of priority from Japanese Patent Application No. 2011-258661, filed on 28 Nov. 2011, the content of which is incorporated herein by reference.

BACKGROUND OF THE INVENTION

1. Field of the Invention

The present invention relates to an electronic device capable of receiving power by electromagnetic waves that are output from a battery charger.

2. Related Art

Some electronic devices such as mobile telephone devices are installed in a motor vehicle for the purpose of functioning as an event data recorder. When such an electronic device is installed in a motor vehicle, the electronic device is supplied with power from a cradle (contactless battery charger) containing the electronic device, and is connected through communication with a hands-free device such as a head set (Related Art 1).

SUMMARY OF THE INVENTION

However, in a case in which the electronic device of Related Art 1 is not installed in a motor vehicle, the electronic device is not continuously supplied with power, and a telephone call cannot be made in a hands-free mode.

For example, in a case in which the charging capacity of a secondary battery is decreased due to making telephone calls while the electronic device is not installed in a motor vehicle, contactless charge must be performed. However, since the electronic device is not installed in a motor vehicle, a telephone call cannot be made in a hands-free mode. Therefore, while the contactless charge is performed for the electronic device, the user has been forced to make a telephone call by being separated from the electronic device, and it has been difficult to continue a telephone call.

An object of the present invention is to provide an electronic device capable of continuing a telephone call, even in a case in which power is received from a battery charger while the telephone call is made.

An electronic device of the present invention includes a power receiving unit and a speaker unit. The power receiving unit receives power from a battery charger by electromagnetic waves. The speaker unit outputs sound in a first mode or a second mode. The first mode is a sound output mode when the electronic device is made proximate to the user's ear. The second mode is a sound output mode when the electronic device is separated from the user's ear. In a case in which the power receiving unit is receiving power, the speaker unit outputs sound in the second mode.

It is preferable for the electronic device to further include a determination unit that receives identification information for identifying the battery charger, and determines whether the battery charger is disposed at a predetermined place, based on the identification information. In a case in which the determination unit determines that the battery charger is disposed at the predetermined place, when the power receiving unit receives power, it is preferable for the speaker unit to output sound in the second mode.

It is preferable for the electronic device to further include: a conversion unit that converts sound into characters in a case in which the determination unit determines that the battery charger is disposed at a place other than the predetermined place; and a display unit that displays the characters converted by the conversion unit.

It is preferable for the electronic device to further include a transmitting unit that transmits data of the sound to the battery charger so as to output the sound from a second speaker disposed in the battery charger when a mode is switched to the second mode, in a case in which the second speaker is disposed in the battery charger.

It is preferable for the electronic device to further include a detecting unit that detects that the electronic device is separated from the battery charger. In a case in which the speaker unit outputs sound in the second mode, when the detecting unit detects that the electronic device is separated from the battery charger, it is preferable for the speaker unit to output sound in the first mode.

It is preferable for the electronic device to further include a communication unit that is capable of receiving data of sound by connecting to a communication network. It is preferable for the speaker unit to output the sound based on the data of sound.

It is preferable for the second mode to be a mode, in which the speaker unit outputs sound at a volume higher than a volume in the first mode.

It is preferable for the speaker unit to include: a receiver that is proximate to the user's ear when the electronic device is made proximate to the user's ear; and a speaker that is disposed in a position different from a position of the receiver. It is preferable for sound to be output from the receiver in the first mode, and it is preferable for sound to be output from the speaker in the second mode.

The electronic device of the present invention includes a power receiving unit, a bone conduction unit, a speaker unit, and a control unit. The power receiving unit receives power from a battery charger by electromagnetic waves. The bone conduction unit is abutted on the user's ear to conduct sound to the user. The speaker unit outputs sound. The control unit drives the bone conduction unit in a case in which the power receiving unit is not receiving power. The control unit drives the speaker unit in a case in which the power receiving unit is receiving power.

The electronic device of the present invention includes a power receiving unit, a cartilage conduction unit, a speaker unit, and a control unit. The power receiving unit receives power from a battery charger by electromagnetic waves. The cartilage conduction unit is abutted on the user's ear to conduct sound to the user. The speaker unit outputs sound. The control unit drives the cartilage conduction unit in a case in which the power receiving unit is not receiving power. The control unit drives the speaker unit in a case in which the power receiving unit is receiving power.

According to the present invention, it is possible to continue a telephone call, even in a case in which power is received from a battery charger while the telephone call is made.

DETAILED DESCRIPTION OF THE INVENTION

An embodiment for carrying out the present invention is described in detail with reference to the drawings. A smartphone is hereinafter described as an example of an electronic device.

Embodiment

Figure 1:
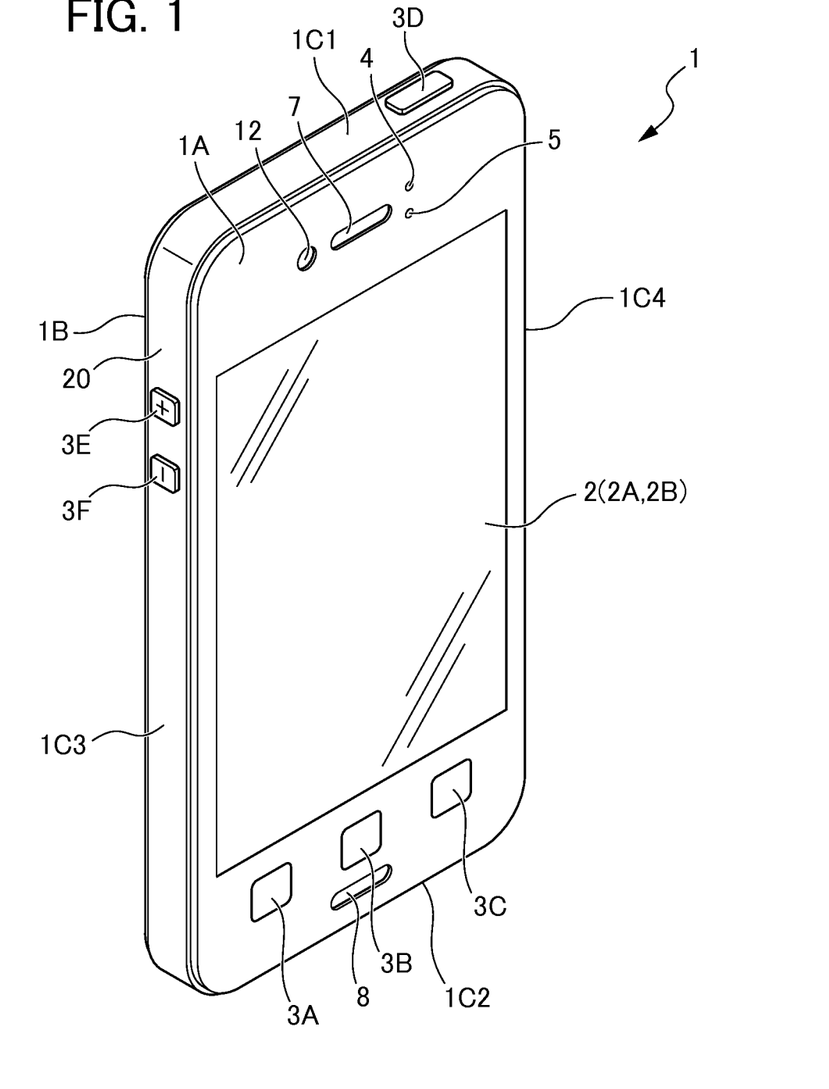
FIG. 1 is a perspective view showing an external appearance of a smartphone according to an embodiment.
Figure 2:
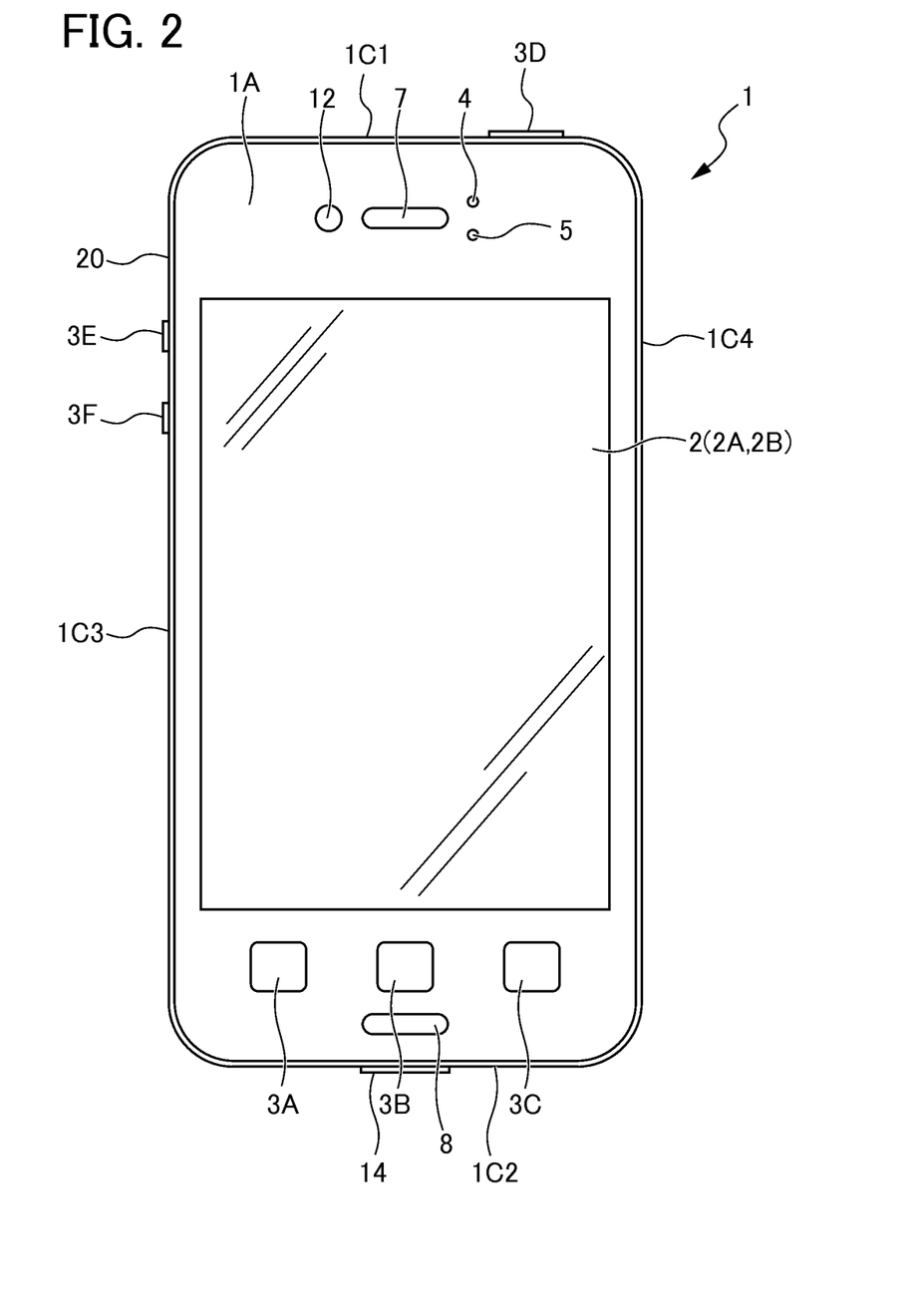
FIG. 2 is a front view showing the external appearance of the smartphone according to an embodiment.
Figure 3:
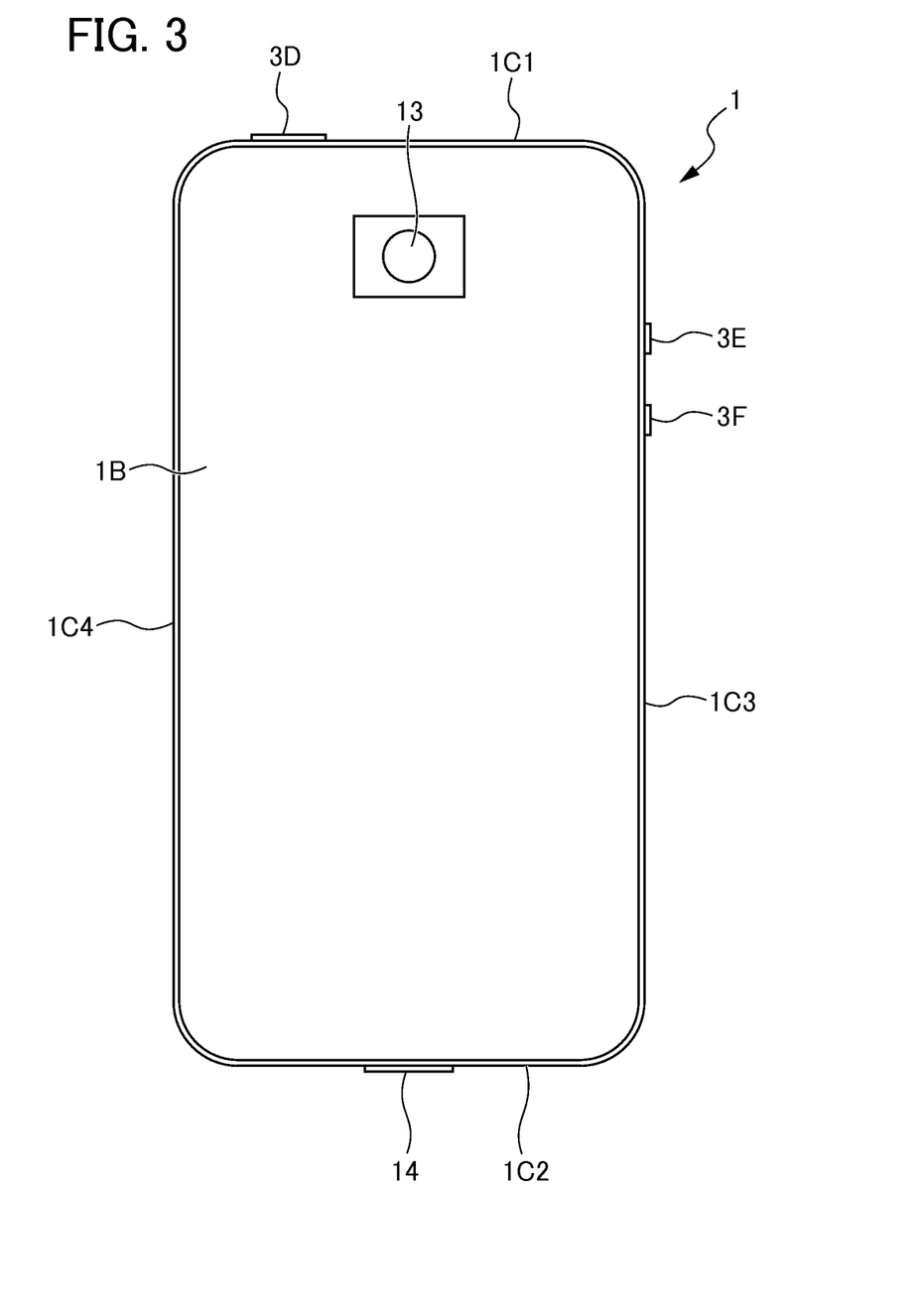
FIG. 3 is rear view showing the external appearance of the smartphone according to an embodiment.

Descriptions are provided for an external appearance of a smartphone 1 according to the embodiment with reference to FIGS. 1 to 3. As shown in FIGS. 1 to 3, the smartphone 1 has a housing 20. The housing 20 has a front face 1A, a back face 1B, and side faces 1C1 to 1C4. The front face 1A is a front face of the housing 20. The back face 1B is a back face of the housing 20. The side faces 1C1 to 1C4 are side faces that connect the front face 1A and the back face 1B. In the following descriptions, the side faces 1C1 to 1C4 may be collectively referred to as a side face 1C without specifying which face.

On the front face 1A, the smartphone 1 has a touch-screen display 2, buttons 3A to 3C, an illuminance sensor 4, a proximity sensor 5, a receiver 7, a microphone 8, and a camera 12. The smartphone 1 has a camera 13 in the back face 1B. The smartphone 1 has buttons 3D to 3F and an external interface 14 in the side face 1C. In the following descriptions, the buttons 3A to 3F may be collectively referred to as a button 3 without specifying which button.

The touch-screen display 2 has a display 2A and a touch screen 2B. The display 2A includes a display device such as a liquid crystal display, an organic electro-luminescence panel, or an inorganic electro-luminescence panel. The display 2A displays characters, images, symbols, graphics or the like.

The touch screen 2B detects a touch by a finger, a stylus pen or the like to the touch-screen display 2. The touch screen 2B detects a position where a plurality of fingers, the stylus pen or the like touch the touch-screen display 2. The touch screen 2B includes a panel exposed to outer space of the smartphone 1. The panel is made of glass or synthetic resin such as acryl, but not limited to them. The panel may be made of tempered glass. The panel may be larger than user's ear.

A detection method for the touch screen 2B may be any method such as a capacitive sensing method, a resistor film method, a surface acoustic wave method (or an ultrasonic sensing method), an infrared ray method, and an electromagnetic induction method. In the following, for the purpose of simplifying descriptions, the fingers, the stylus pen or the like may be simply referred to as a "finger", a touch by which to the touch-screen display 2 is detected by the touch screen 2B.

The smartphone 1 distinguishes a type of a gesture, based on a touch(s), a touched position(s), a touching period of time, or a touching number of times, detected by the touch screen 2B. The gesture is an operation that is performed on the touch-screen display 2. Gestures that are distinguished by the smartphone 1 include a touch, a long touch, a release, a swipe, a tap, a double tap, a long tap, a drag, a flick, a pinch-in, a pinch-out, and the like.

The touch is a gesture by a single touch. More specifically, the touch is a gesture of a finger touching the touch-screen display 2 (for example, a surface thereof). The smartphone 1 distinguishes the gesture of a finger touching the touch-screen display 2 as a touch. The long touch is a gesture of a finger touching the touch-screen display 2 for more than a certain period of time. The smartphone 1 distinguishes the gesture of a finger touching the touch-screen display 2 for more than a certain period of time as a long touch.

The release is a gesture of a finger being released from the touch-screen display 2. The smartphone 1 distinguishes the gesture of a finger being released from the touch-screen display 2 as a release. The swipe is a gesture of a finger moving while touching the touch-screen display 2. The smartphone 1 distinguishes the gesture of a finger moving while touching the touch-screen display 2 as a swipe.

The tap is a consecutive gesture of touch and release. The smartphone 1 distinguishes the consecutive gesture of touch and release as a tap. The double tap is a gesture of repeating a consecutive gesture of touch and release two times. The smartphone 1 distinguishes the gesture of repeating a consecutive gesture of touch and release two times as a double tap.

The long tap is a consecutive gesture of a long touch and release. The smartphone 1 distinguishes the consecutive gesture of a long touch and release as a long tap. The drag is a gesture of swiping from a starting point where a movable object is displayed. The smartphone 1 distinguishes the gesture of swiping from a starting point where a movable object is displayed as a drag.

The flick is a consecutive gesture of touch and release of a finger moving at a high-speed in one direction. The smartphone 1 distinguishes the gesture of touch and release of a finger moving at a high-speed in one direction as a flick. The flick includes: an upward flick of a finger moving in an upward direction on the screen; a downward flick of a finger moving in a downward direction on the screen; a rightward flick of a finger moving in a rightward direction on the screen; a leftward flick of a finger moving in a leftward direction on the screen; and the like.

The pinch-in is a gesture of a plurality of fingers swiping in mutually approaching directions. The smartphone 1 distinguishes the gesture of a plurality of fingers swiping in mutually approaching directions as a pinch-in. The pinch-out is a gesture of a plurality of fingers swiping in mutually receding directions. The smartphone 1 distinguishes the gesture of a plurality of fingers swiping in mutually receding directions as a pinch-out.

In the present embodiment, a gesture of a single finger may be referred to as a single touch gesture. In the present embodiment, a gesture of at least two fingers may be referred to as a multi-touch gesture. The pinch-in and the pinch-out are the multi-touch gestures. The tap, the flick, the swipe, etc. are the single touch gestures if performed by a single finger, and are multi-touch gestures if performed by at least two fingers.

The smartphone 1 is operated in accordance with these gestures that are distinguished via the touch screen 2B. Therefore, intuitive and easy-to-use operability is achieved for a user. An operation, which is performed by the smartphone 1 in accordance with a gesture thus distinguished, is different depending on a screen that is displayed on the touch-screen display 2.

Figure 4:
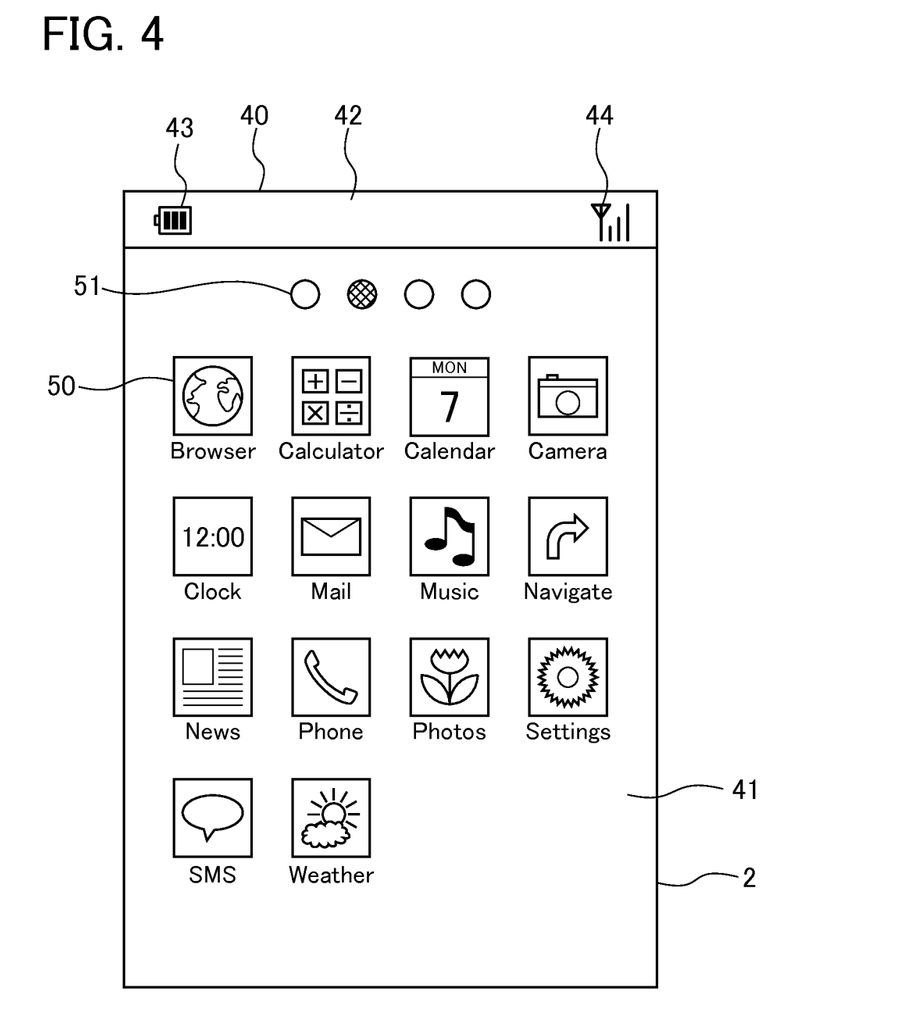
FIG. 4 is a diagram showing an example of a home screen.

An example of a screen displayed on the display 2A is described with reference to FIG. 4. FIG. 4 shows an example of a home screen. The home screen may be called a desktop or an idle screen. The home screen is displayed on the display 2A. The home screen is a screen for allowing the user to select which application to be executed among applications installed in the smartphone 1. When an application is selected in the home screen, the smartphone 1 executes the application in the foreground. The screen of the application executed in the foreground is displayed on the display 2A.

The smartphone 1 can arrange icons in the home screen. A plurality of icons 50 are arranged in the home screen 40 shown in FIG. 4. The icons 50 are previously associated with the applications installed in the smartphone 1, respectively. When the smartphone 1 detects a gesture on an icon 50, an application associated with the icon 50 is executed. For example, when the smartphone 1 detects a tap on an icon 50 associated with a mail application, the mail application is executed. Here, for example, the smartphone 1 interprets the gesture on a position (area), which corresponds to a display position (area) of the icon 50 on the touch-screen display 2, as an instruction to execute an application associated with the icon 50.

The icon 50 includes an image and a character string. The icon 50 may include a symbol or graphics in place of the image. The icon 50 may not include any one of the image or the character string. The icons 50 are arranged in accordance with a predetermined rule. A wall paper 41 is displayed behind the icons 50. The wall paper may also be called a photo screen or a back screen. The smartphone 1 can use an arbitrary image as the wall paper 41. An arbitrary image is determined as the wall paper 41, for example, in accordance with the setting by the user.

The smartphone 1 can increase and decrease the number of home screens. The smartphone 1 determines the number of home screens, for example, in accordance with the setting by the user. Even in a case in which there are a plurality of home screens, the smartphone 1 selects a single home screen from the plurality of home screens, and displays the single home screen on the display 2A.

The smartphone 1 displays one or more locators on the home screen. The number of the locators coincides with the number of the home screens. The locator indicates the position of the currently displayed home screen. The locator corresponding to the currently displayed home screen is displayed in a manner different from the other locators.

Four locators 51 are displayed in the example shown in FIG. 4. This indicates that there are four home screens 40. In the example shown in FIG. 4, the second symbol (locator) from the left is displayed in a manner different from the other symbols (locators). This indicates that the second home screen from the left is currently displayed.

When the smartphone 1 detects a particular gesture while displaying the home screen, the home screen displayed on the display 2A is switched. For example, when the smartphone 1 detects a rightward flick, the home screen displayed on the display 2A is switched over to a next home screen to the left. When the smartphone 1 detects a leftward flick, the home screen displayed on the display 2A is switched over to a next home screen to the right.

An area 42 is provided at the top edge of the display 2A. A remaining-level mark 43 indicating a remaining level of the rechargeable battery, and a radio wave level mark 44 indicating field intensity of radio waves for communication are displayed in the area 42. In the area 42, the smartphone 1 may display current time, weather information, active applications, a type of communication system, a telephone status, a device mode, events occurred to the device, etc. In this way, the area 42 is used for making various notifications to the user. The area 42 may be provided as another screen separate from the home screen 40. The position of providing the area 42 is not limited to the top edge of the display 2A.

The home screen 40 shown in FIG. 4 is an example, and shapes of various elements, layouts of various elements, the number of home screens 40, and the manner of various operations on the home screen 40 may not be as described in the above descriptions.

Figure 5:
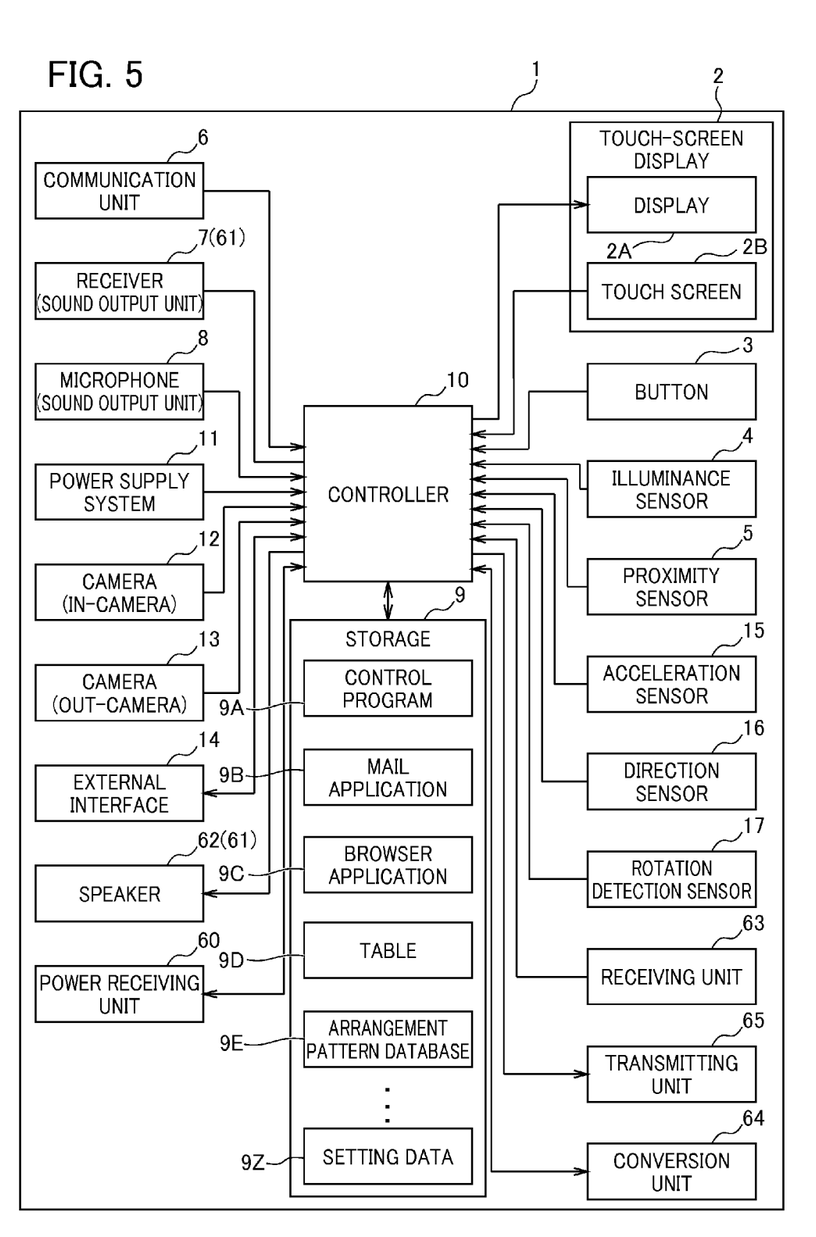
FIG. 5 is a block diagram showing functions of the smartphone according to an embodiment.

FIG. 5 is a block diagram showing a configuration of the smartphone 1. The smartphone 1 has the touch-screen display 2, the button 3, the illuminance sensor 4, the proximity sensor 5, a communication unit 6, the receiver 7, the microphone 8, a storage 9, a controller 10, cameras 12 and 13, an external interface 14, an acceleration sensor 15, a direction sensor 16, and a rotation detection sensor 17.

As described above, the touch-screen display 2 has the display 2A and the touch screen 2B. The display 2A displays characters, images, symbols, graphics or the like. The touch screen 2B detects a gesture.

The button 3 is operated by the user. The button 3 has the buttons 3A to 3F. The controller 10 collaborates with the button 3 to detect an operation of the button. The operation of the button is, for example, a click, a double click, a push, and a multi-push.

For example, the buttons 3A to 3C are a home button, a back button or a menu button. For example, the button 3D is a power on/off button of the smartphone 1. The button 3D may also serve as a sleep/wake-up button. For example, the buttons 3E and 3F are a button for turning up the volume, and a button for turning down the volume, respectively.

The illuminance sensor 4 detects illuminance. For example, the illuminance is intensity, brightness, brilliance, etc. of light. For example, the illuminance sensor 4 is used for adjusting the brilliance of the display 2A.

The proximity sensor 5 detects presence of a proximate object in a contactless manner. The proximity sensor 5 detects, for example, a face being brought close to the touch-screen display 2.

The communication unit (communication unit) 6 performs wireless communication. Communication methods implemented by the communication unit 6 are wireless communication standards. For example, the wireless communication standards include cellular phone communication standards such as 2G, 3G and 4G. For example, the cellular phone communication standards include LTE (Long Term Evolution), W-CDMA, CDMA2000, PDC, GSM, PHS (Personal Handy-phone System), etc. For example, the wireless communication standards include WiMAX (Worldwide Interoperability for Microwave Access), IEEE 802.11, Bluetooth (registered trademark), IrDA, NFC (Near Field Communication), etc. Communication unit 6 may support one or more of the communication standards described above. Therefore, the communication unit 6 can perform communication for telephone calls by connecting to a communication network.

When a sound signal is transmitted from the controller 10, the receiver 7 outputs the sound signal as sound. The microphone 8 converts sound such as the user's voice into a sound signal, and transmits the sound signal to the controller 10. The smartphone 1 may further have a speaker(s) in addition to the receiver 7. The smartphone 1 may further have a speaker(s) in place of the receiver 7.

The storage 9 stores programs and data. The storage 9 is also utilized as a working area for temporarily storing processing results of the controller 10. The storage 9 may include an arbitrary storage device such as a semi-conductor storage device and a magnetic storage device. The storage 9 may include several types of storage devices. The storage 9 may include combination of a portable storage medium such as a memory card with a reader for the storage medium.

The programs stored in the storage 9 include: applications that are executed in the foreground or the background; and a control program that assists operations of the applications. For example, an application causes the display 2A to display a predetermined screen, and causes the controller 10 to execute processing in accordance with a gesture detected by the touch screen 2B. The control program is, for example, an OS. The applications and the control program may be installed in the storage 9 via wireless communication by the communication unit 6 or via a storage medium.

The storage 9 stores, for example, a control program 9A, a mail application 9B, a browser application 9C, and setting data 9Z. The mail application 9B provides electric mail functions of creating, transmitting, receiving and displaying electric mail. The browser application 9C provides a web browsing function of displaying web pages. A table 9D stores various tables such as a key assignment table. An arrangement pattern database 9E stores patterns of arrangement such as arrangement of icons displayed on the display 2A. The setting data 9Z provides various set-up functions regarding operations of the smartphone 1.

The control program 9A provides functions regarding a variety of control for operating the smartphone 1. For example, the control program 9A implements a telephone call function by controlling the communication unit 6, the receiver 7, the microphone 8, etc. The functions provided by the control program 9A include functions of executing a variety of control such as changing the information displayed on the display 2A in accordance with a gesture detected via the touch screen 2B. The functions provided by the control program 9A may be utilized in combination with functions provided by other programs such as the mail application 9B.

The controller 10 is, for example, a CPU (Central Processing Unit). The controller 10 may be an integrated circuit such as an SoC (System-on-a-chip) that integrates other constituent elements such as the communication unit 6. The controller 10 comprehensively controls the operations of the smartphone 1 to implement various functions.

More specifically, the controller 10 implements various functions by referring to data stored in the storage 9 as necessary, executing instructions included in a program stored in the storage 9, and controlling the display 2A, the communication unit 6, etc. The controller 10 may change the control in accordance with a result of detection by various detecting units such as the touch screen 2B, the button 3 and the acceleration sensor 15.

For example, the controller 10 executes the control program 9A to execute a variety of control such as changing the information displayed on the display 2A in accordance with a gesture detected via the touch screen 2B.

The camera 12 is an in-camera that photographs an object from a side of the front face 1A. The camera 13 is an out-camera that photographs an object from a side of the back face 1B.

The external interface 14 is a terminal, to which another device is connected. The external interface 14 may be a universal terminal such as USB (Universal Serial Bus), HDMI (High-Definition Multimedia Interface), Light Peak (Thunderbolt), and an earpiece-microphone connector. The external interface 14 may be a terminal designed for exclusive use, such as a Dock connector. A device that is connected to the external interface 14 includes, for example, an external storage, a speaker, and a communication device.

The acceleration sensor 15 detects a direction and level of acceleration that acts on the smartphone 1. The direction sensor 16 detects an orientation of geomagnetism. The rotation detection sensor 17 detects rotation of the smartphone 1.

Results of such detection by the acceleration sensor 15, the direction sensor 16 and the rotation detection sensor 17 are utilized in combination to detect change in the position and posture of the smartphone 1.

Figure 6:
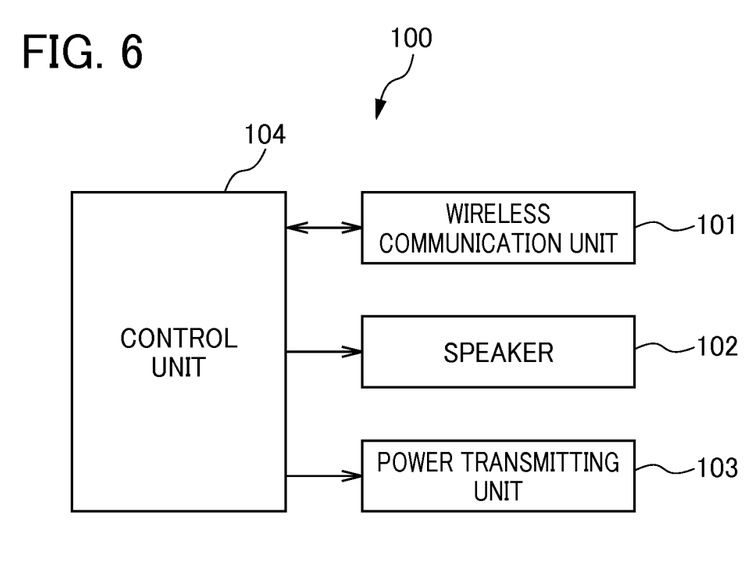
FIG. 6 is a block diagram showing functions of a battery charger.

Here, descriptions are provided for an overview of a contactless battery charger 100 that supplies power to the smartphone 1. FIG. 6 is a block diagram showing functions of the battery charger 100. The battery charger 100 includes a wireless communication unit 101, a speaker 102, and a power transmitting unit 103. In a case in which the smartphone 1 is proximate to the battery charger 100, the wireless communication unit 101 communicates with the smartphone 1. The wireless communication unit 101 periodically transmits identification information for identifying the battery charger 100. The speaker 102 outputs sound. The power transmitting unit 103 includes a coil or an antenna. The coil or the antenna outputs electromagnetic waves. When the smartphone 1 receives the electromagnetic waves, the smartphone 1 receives power by the electromagnetic waves. The control unit 104 controls the wireless communication unit 101, the speaker 102, and the power transmitting unit 103.

Next, descriptions are provided for a characteristic part of the smartphone 1. The smartphone 1, which is configured as described above, has a function capable of continuing a telephone call, even in a case in which power is received from the battery charger 100 when the telephone call is made. More specifically, as shown in FIG. 5, the smartphone 1 includes: a power receiving unit 60 that enables contactless-type charge (contactless charge); and a speaker unit 61.

The power receiving unit 60 receives power from the battery charger 100 (see FIG. 6) by electromagnetic waves. More specifically, the coil (not shown) of the power receiving unit 60 receives power by electromagnetic waves that are output from the battery charger 100, and the energy per unit time of the electromagnetic waves is converted into power by electromagnetic induction. The power receiving unit 60 charges a secondary battery (not shown) with the power thus converted.

The speaker unit 61 outputs sound in a first mode as a sound output mode in a case in which the smartphone 1 (the housing 20) is made proximate to the user's ear; or a second mode as a sound output mode in a case in which the smartphone 1 (the housing 20) is separated from the user's ear.

The first mode is a mode of outputting sound from the speaker unit 61 at an optimized volume when the smartphone 1 is made proximate to the user's ear. In the first mode, if the smartphone 1 is separated from the user's ear, the volume of sound that is output from the speaker unit 61 is too low for the user.

In the second mode, for example, the volume of sound that is output from the speaker unit 61 is higher than the volume in the first mode. In a case in which sound is output from the speaker unit 61 in the second mode, since the volume is high, the user can hear the sound that is output from the speaker unit 61 even if the user does not dispose the smartphone 1 proximate to the user's ear. In other words, the second mode is a hands-free mode.

It is preferable for the speaker unit 61 to include the receiver 7 and a speaker 62. In a case in which the smartphone 1 is made proximate to the user's ear, the receiver 7 is in a position proximate to the user's ear. The speaker 62 is disposed in a position different from the position of the receiver 7. For example, in the first mode, sound is output from the receiver 7. In the second mode, sound is output from the speaker 62.

In a case in which the power receiving unit 60 is receiving power, the speaker unit 61 outputs sound in the second mode. More specifically, in a case in which the communication unit 6 is performing communication for a telephone call, when the smartphone 1 is placed on the contactless battery charger 100, the controller 10 switches the mode of outputting sound from the speaker unit 61, from the first mode to the second mode. As a result, when the communication unit 6 obtains sound of the communication partner by the communication for a telephone call, the speaker unit 61 outputs the sound in the second mode. Here, in a case in which the power receiving unit 60 receives power (for example, in a case in which power of at least a predetermined threshold value is received), the controller 10 determines that the smartphone 1 is placed on the battery charger 100.

As a result, even in a case in which electromagnetic waves transmitted from the battery charger 100 are converted into power while a telephone call is made, the smartphone 1 can continue the telephone call.

In a case in which the user operates the button 3E (see FIG. 1) when the mode is switched to the second mode, it is preferable for the controller 10 to turn up the volume of sound that is output from the speaker unit 61. In a case in which the user operates the button 3F (see FIG. 1) when the mode is switched to the second mode, it is preferable for the controller 10 to turn down the volume of sound that is output from the speaker unit 61. It is preferable for the controller 10 to input noise around the smartphone 1 by the microphone, and to make adjustment such that the volume of sound that is output from the speaker unit 61 is higher than the volume of the noise.

It is preferable for the smartphone 1 to further include a receiving unit 63 and a determination unit 10A. The receiving unit 63 receives identification information from the battery charger 100. The identification information is information for identifying the battery charger 100. More specifically, in a case in which the smartphone 1 is made proximate to the battery charger 100, more specifically, in a case in which the smartphone 1 enters the communication range of the wireless communication unit 101 disposed in the battery charger 100, the receiving unit 63 receives the identification information transmitted from the wireless communication unit 101. Identification information is set for each battery charger 100. The identification information is composed of, for example, numeric character data or non-numeric character data.

Figure 7:
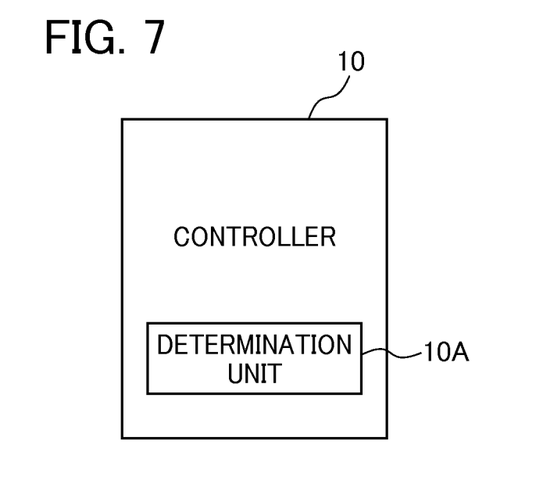
FIG. 7 is a block diagram showing functions of a controller.

Based on the identification information received by the receiving unit 63, the determination unit 10A determines whether the battery charger that transmitted the identification information is the battery charger 100 disposed at a predetermined place. As shown in FIG. 7, the determination unit 10A is implemented as a function of the controller 10. The predetermined place is, for example, a non-public place such as the user's home. The storage 9 stores identification information of the battery charger 100 in advance which is disposed at the predetermined place. Based on the identification information received by the receiving unit 63, and on the identification information stored in the storage 9 in advance, the determination unit 10A determines whether the battery charger 100 is disposed at the predetermined place.

In a case in which the determination unit 10A determines that the battery charger 100 is disposed at the predetermined place, when the power receiving unit 60 receives power, the speaker unit 61 outputs sound in the second mode. More specifically, in a case in which a telephone call is currently being made by the communication unit 6, when the smartphone 1 is placed on the contactless battery charger 100, and the determination unit 10A determines that the battery charger 100 is disposed at the predetermined place, the controller 10 switches the mode of outputting sound from the speaker unit 61, from the first mode to the second mode. As a result, the speaker unit 61 outputs sound in the second mode.

Thus, in a case in which the smartphone 1 is placed on the battery charger 100 disposed at the predetermined place that is not a public place, the smartphone 1 is set to the second mode. Therefore, it is possible to reduce the possibility for the output sound to be heard by a third party. The smartphone 1 can reduce the possibility for sound of a telephone call to be a nuisance to a third party.

As shown in FIG. 5, it is preferable for the smartphone 1 to further include a conversion unit 64. In a case in which the determination unit 10A determines that the battery charger 100 is disposed at a place other than the predetermined place, the conversion unit 64 converts sound into characters. More specifically, in a case in which the determination unit 10A determines that the battery charger 100 is disposed at a place other than the predetermined place, the controller 10 supplies the conversion unit 64 with sound data of the communication partner obtained by the communication unit 6. The conversion unit 64 converts the sound data of the communication partner obtained by the communication unit 6 into character information by voice recognition. When the controller 10 obtains the character information converted by the conversion unit 64, the controller 10 causes the touch-screen display 2 to display characters based on the character information. More specifically, the touch-screen display 2 displays characters converted by the conversion unit 64. The touch-screen display 2 corresponds to an embodiment of the "display unit" of the present invention.

In a case in which the determination unit 10A determines that the battery charger 100 is disposed at a place other than the predetermined place, the controller 10 causes the camera 12 or 13, which is disposed on a side opposite to the battery charger 100, to capture the user's face. As a specific example, the controller 10 activates both the cameras 12 and 13, recognizes images captured by the cameras 12 and 13, respectively, and determines whether a face is captured. Since a camera being disposed to face the battery charger 100 cannot capture a face, the controller 10 cannot perform image recognition (facial recognition) with such a camera. Therefore, the controller 10 suspends the operation of the camera that captured an image that does not allow facial recognition. In a case in which the controller 10 can recognize a face based on the image captured by the camera, the controller 10 reads movement of the user's mouth to recognize what is spoken, and causes the communication unit 6 to transmit sound data based on the recognition to a mobile telephone device of the communication partner. The recognition and the sound output utilize, for example, data stored in the storage 9, in which a shape of a mouth, a word to be spoken when the mouth takes the shape, and sound of the word are associated with one another. As a result, even if the user moves only the mouth without uttering a voice, the controller 10 reads sound corresponding to the movement of the mouth (the shape of the mouth) from the storage 9, and transmits the sound to the mobile telephone device of the communication partner.

In a case in which a character input button displayed on the touch-screen display 2 is operated, the controller 10 may cause the communication unit 6 to transmit sound, which corresponds to the button (character) thus operated, to the mobile telephone device of the communication partner.

For example, a character is assigned to the button, and data is stored in the storage 9 in advance, in which the button is associated with sound of the character. In a case in which a button with a character "I" assigned thereto is operated, the controller 10 refers to data stored in the storage 9, and causes the communication unit 6 to transmit data of sound of "I"

corresponding to the character "I" to the mobile telephone device of the communication partner.

In this case, a series of sound may be associated in advance with a character that abbreviates the series of sound. In a case in which a button corresponding to the character is operated, the controller 10 causes the communication unit 6 to transmit data of a series of sound corresponding to the character to the mobile telephone device of the communication partner.

As a specific example, a series of sound "I go playing" is associated in advance with the character "I". In a case in which the character "I" is assigned to a button displayed on the touch-screen display 2, and this button is operated, the controller 10 causes the communication unit 6 to transmit data of the series of sound "I go playing" associated with the character "I" to the mobile telephone device of the communication partner.

Therefore, in a case in which the determination unit 10A determines that the battery charger 100 is disposed at a place other than the predetermined place, the smartphone 1 is not switched to the second mode, and causes the touch-screen display 2 to display utterance of the communication partner in characters. As a result, it is possible to reduce the possibility for contents of a telephone call to be heard by a third party. The smartphone 1 can reduce the possibility for sound of a telephone call to be a nuisance to a third party.

In a case in which the determination unit 10A determines that the battery charger 100 is disposed at a place other than the predetermined place, even if the user moves only the mouth without uttering a voice, the smartphone 1 synthesizes sound data based on the movement of the mouth, or synthesize sound data from an input character, and transmits the synthesized sound data to the mobile telephone device of the communication partner. As a result, the smartphone 1 can reduce the possibility for contents of a telephone call to be heard by a third party. The smartphone 1 can reduce the possibility for a telephone call to be a nuisance to a third party.

It is preferable for the smartphone 1 to further include a transmitting unit 65. In a case in which the speaker 102 (see FIG. 6) is disposed in the battery charger 100, when the mode is switched to the second mode, the transmitting unit 65 transmits sound data to the battery charger 100 so as to output sound from the speaker 102 disposed in the battery charger 100.

More specifically, in a case in which the communication unit 6 is performing communication for a telephone call, when the mode is switched to the second mode, the controller 10 supplies the transmitting unit 65 with the sound data of the communication partner obtained by the communication unit 6. The transmitting unit 65 transmits the sound data to the wireless communication unit 101 (see FIG. 6) of the battery charger 100. When the wireless communication unit 101 receives the sound data, the battery charger 100 causes the speaker 102 to output sound based on the data. The volume of sound that is output from the speaker 102 of the battery charger 100 is adjusted by the user who operates means for adjusting volume (not shown) disposed in the battery charger 100. The means for adjusting volume is, for example, a volume adjustment dial.

As a result, in a case in which the mode is switched to the second mode, the smartphone 1 can output sound of the communication partner from the speaker 102 of the battery charger 100.

In this way, in a case in which the battery charger 100 including the speaker 102 outputs sound, the battery charger 100 transmits identification information, similarly to the aforementioned embodiment. The smartphone 1 may determine whether sound data should be transmitted to the battery charger 100, based on the identification information received from the battery charger 100.

It is preferable for the smartphone 1 to further include a detecting unit. The detecting unit detects that the smartphone 1 is separated from the battery charger 100. As a specific example, the detecting unit is the acceleration sensor 15. More specifically, in a case in which the power receiving unit 60 is receiving power, when acceleration is applied thereto, the acceleration sensor 15 detects that the smartphone 1 is separated from the battery charger 100. In this case, the controller 10 switches the sound, which was output from the speaker unit 61 in the second mode, to be output in the first mode. More specifically, in a case in which the speaker unit 61 outputs sound in the second mode, when the acceleration sensor 15 (the detecting unit) detects that the distance between the battery charger 100 and the smartphone 1 is separated, the speaker unit 61 outputs sound in the first mode.

The detecting unit may be the power receiving unit 60. In this case, while the power receiving unit 60 is receiving power, when the received power is reduced to be lower than a preset threshold value, the power receiving unit 60 detects that the smartphone 1 is separated from the battery charger 100.

The detecting unit may be the receiving unit 63. In this case, while power is being received from the battery charger 100, when the receiving unit 63 can no longer receive an identification signal transmitted from the battery charger 100, the receiving unit 63 detects that the smartphone 1 is separated from the battery charger 100.

In a case in which the power receiving unit 60 is receiving power, when the smartphone 1 is separated from the battery charger 100, the user is likely to make a telephone call by putting the smartphone 1 to the ear. Therefore, the smartphone 1 outputs sound from the speaker unit 61 in the first mode.

In a case in which the power receiving unit 60 charges the secondary battery with the power thus received, it is preferable for the controller 10 to cause the touch-screen display 2 to display the charging capacity until the secondary battery is fully charged, or until the charging capacity of the secondary battery reaches a predetermined level, by monitoring the charging capacity of the secondary battery. The predetermined charging capacity is, for example, 60% of the 100% full charging capacity. As a result, the smartphone 1 can indicate time required for restoring the charging capacity of the secondary battery to the user.

Figure 8:
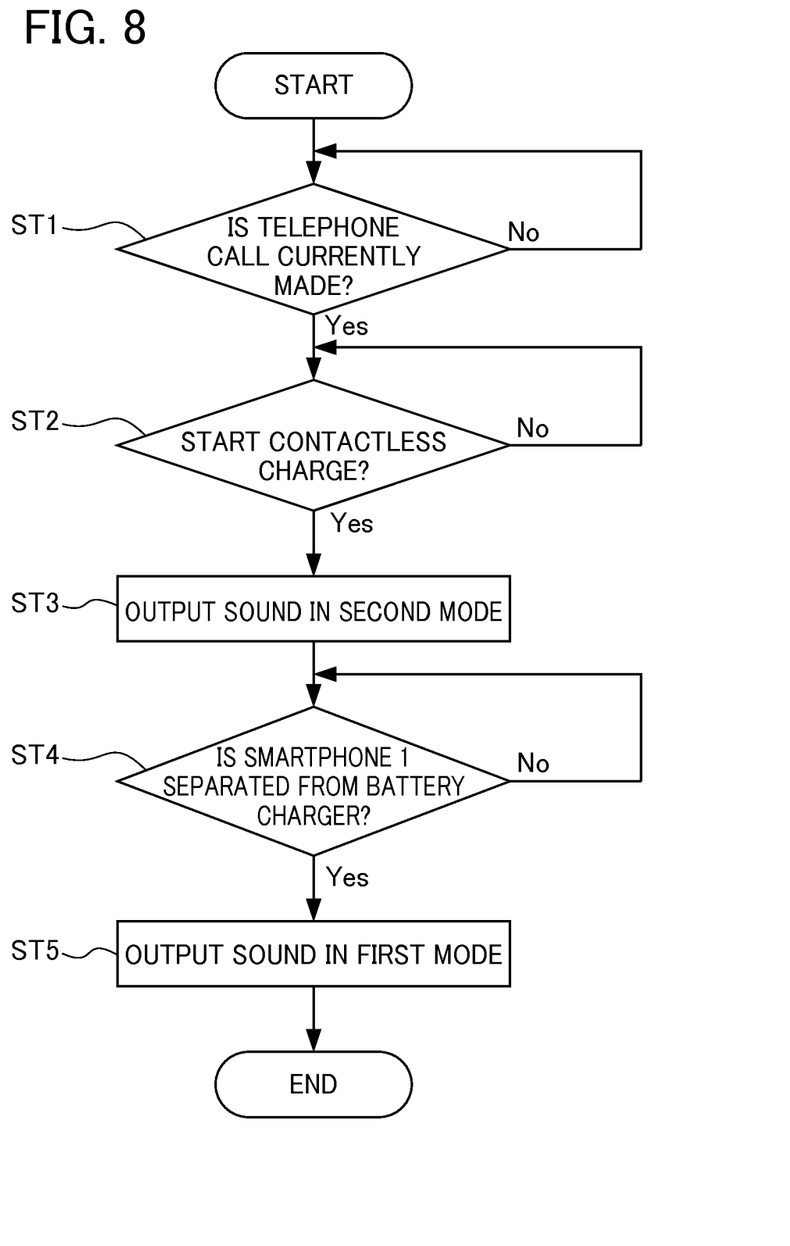
FIG. 8 is a flowchart for illustrating basic operations for switching a first mode and a second mode.

Next, descriptions are provided for basic operations of switching the first mode and the second mode. FIG. 8 is a flowchart for illustrating the basic operations of switching the first mode and the second mode.

In Step ST1, the controller 10 determines whether the communication unit 6 is currently performing communication for a telephone call. Here, in a case in which communication is currently being performed for a telephone call, the speaker unit 61 (the receiver 7) outputs sound in the first mode. In a case in which it is determined that communication is not currently being performed for a telephone call (No), the determination processing in Step ST1 is repeated. In a case in which it is determined that communication is currently being performed for a telephone call (Yes), the processing advances to Step ST2.

In Step ST2, the controller 10 determines whether contactless charge is initiated. More specifically, in a case in which the power receiving unit 60 receives power, the controller 10 determines that the contactless charge is initiated. In a case in which the contactless charge is not initiated (No), the determination processing in Step ST2 is repeated. In a case in which the contactless charge is initiated (Yes), the processing advances to Step ST3.

In Step ST3, the controller 10 causes the speaker unit 61 (the receiver 7 or the speaker 62) to output the sound of the communication partner, which was obtained through the communication for a telephone call by the communication unit 6, in the second mode.

In Step ST4, the controller 10 determines whether the smartphone 1 is separated from the battery charger 100. For example, in a case in which the acceleration sensor 15 detects acceleration, the controller 10 determines that the smartphone 1 is separated from the battery charger 100. In a case in which the smartphone 1 is not separated from the battery charger 100 (No), the determination processing in Step ST4 is repeated. In a case in which the smartphone 1 is separated from the battery charger 100 (Yes), the processing advances to Step ST5.

In Step ST5, the controller 10 causes the speaker unit 61 to output the sound of the communication partner, which was obtained through the communication for a telephone call by the communication unit 6, in the first mode.

After Step ST5, the processing is terminated.

Figure 9:
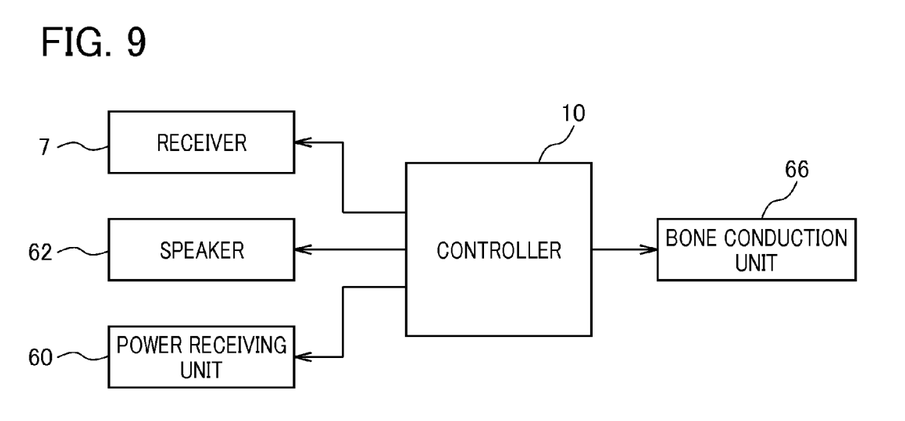
FIG. 9 is a schematic block diagram for illustrating a modification example of the smartphone 1.

Next, descriptions are provided for a modification example of the aforementioned smartphone 1. FIG. 9 is a schematic block diagram for illustrating the modification example of the smartphone 1. Since a functional configuration of the smartphone 1 of the modification example is similar to that shown in FIG. 5, detailed descriptions of the configuration are omitted. More specifically, the smartphone 1 of the modification example mainly includes the power receiving unit 60, a bone conduction unit 66, and the speaker unit 61 (the receiver 7 and the speaker 62).

The power receiving unit 60 is configured similarly to that described with reference to FIG. 5 and the like, and receives power from the battery charger 100 by electromagnetic waves.

In a case in which the power receiving unit 60 is not receiving power, the bone conduction unit 66 outputs sound in the first mode that is a sound output mode when the smartphone 1 (the housing 20) is abutted on the user. For example, the bone conduction unit 66 includes a vibration unit (not shown) that vibrates based on sound, so as to conduct vibration of the vibration unit to the user's bone. As a result, the user can hear sound by bone conduction.

In the present modification example, in a case in which the power receiving unit 60 is not receiving power, the controller 10 causes the bone conduction unit 66 to output vibration based on sound data of the communication partner, which was obtained through communication for a telephone call by the communication unit 6 (not shown in FIG. 9). When the sound data of the communication partner is supplied, the bone conduction unit 66 vibrates the vibration unit based on the sound data. In a case in which the smartphone 1 is in contact with the user's head, the vibration generated by the vibration unit is conducted to the user's bone. As a result, the user can hear the sound by bone conduction.

In a case in which the power receiving unit 60 is receiving power, the speaker unit 61 outputs sound in the second mode that is a sound output mode when the smartphone 1 (the housing 20) is separated from the user's ear. More specifically, in a case in which the power receiving unit 60 is receiving power, the controller 10 causes the speaker unit 61 to output sound of the communication partner, which was obtained through communication for a telephone call by the communication unit 6 (not shown in FIG. 9). In this case, as the speaker unit 61, the receiver 7 or the speaker 62 outputs the sound of the communication partner. More specifically, the controller 10 causes the receiver 7 to output the sound of the communication partner at a relatively high volume, or causes the speaker 62 to output the sound of the communication partner at a volume audible for the user.

As a result, the smartphone 1 can continue a telephone call, even in a case in which power is received from the battery charger 100 while the telephone call is being made.

The smartphone 1 in the modification example may include a cartilage conduction unit (not shown) in place of the bone conduction unit 66. The cartilage conduction unit includes a piezoelectric vibration unit that vibrates the housing 20. The piezoelectric vibration unit is, for example, a piezoelectric element. The piezoelectric element can be attached to an inner surface of the panel of touch screen 2B (touch screen display 2) via an adhesive. The piezoelectric element can vibrate a panel of touch screen 2B (touch screen display 2) instead of the housing 20. The piezoelectric vibration unit is vibrated based on sound data of the communication partner, which was obtained through communication for a telephone call by the communication unit 6 (not shown in FIG. 9). In a case in which the smartphone 1 is made proximate to the user's ear, the vibration of the piezoelectric vibration unit (the vibration of the housing 20) is conducted to a tympanic membrane via the cartilage and the like composing the user's head. Or, in a case in which user's ear is brought into contact with or pressed toward the panel that vibrates based on vibration of the piezoelectric element, the vibration of the panel based on the vibration of the piezoelectric element is conducted to user. In other words, the smartphone 1 generates, by the vibration of the panel, an air conduction sound and a vibration sound that is conducted to user via the contacting area of the user's body. As a result, the user can hear the sound of the communication partner.

The embodiment has been described above for a case in which the speaker unit 61 outputs sound of the communication partner, which was obtained through a telephone call performed by the communication unit 6. However, in a case in which an earpiece is connected to the smartphone 1, the controller 10 causes the earpiece to output sound of the communication partner, which was obtained through a telephone call performed by the communication unit 6.

A part or all of the programs stored in the storage 9 as described in FIG. 5 may be downloaded from other devices through wireless communication by the communication unit 6. A part or all of the programs stored in the storage 9 as described in FIG. 5 may be stored in a storage medium that is readable by a reader included in the storage 9. A part or all of the programs stored in the storage 9 as described in FIG. 5 may be stored in a storage medium such as a CD, a DVD or a Blu-ray (registered trademark) that is readable by a reader connected to the external interface 14.

The configuration of the smartphone 1 shown in FIG. 5 is an example, and may be altered as appropriate within the scope without departing from the spirit of the present invention. For example, the number and type of the button(s) 3 are not limited to the example shown in FIG. 5. For example, the smartphone 1 may include buttons with a numeric keypad layout or a QWERTY keyboard layout, in place of the buttons 3A to 3C, as buttons for operations regarding screens. The smartphone 1 may include only a single button and may not include any button, for operations regarding screens. In the example shown in FIG. 5, the smartphone 1 includes two cameras, but the smartphone 1 may include only a single camera, and may not include any camera. In the example shown in FIG. 5, the smartphone 1 includes three types of sensors for detecting the position and posture, but the smartphone 1 may not include some of these sensors, and may include other types of sensors for detecting the position and posture. The illuminance sensor 4 and the proximity sensor 5 may be configured as a single sensor instead of separate sensors.

A characteristic embodiment has been described for the purpose of completely and clearly disclosing the present invention. However, the invention according to the attached claims should not be limited to the above embodiment, and the invention should be configured to embody all modifications and substitutable configurations that can be created by a person skilled in the art within the scope of the basic matter described herein.

For example, each program shown in FIG. 5 may be divided into a plurality of modules, and may be coupled with other programs.

In the above embodiment, the smartphone has been described as an example of a device including a touch-screen display, but the device according to the attached claims is not limited to a smartphone. For example, the device according to the attached claims may be a portable electronic device such as a mobile phone, a portable personal computer, a digital camera, a media player, an electronic book reader, a navigator or a gaming machine. The device according to the attached claims may be an electronic device of a standing type such as a desktop PC or a television receiver.

In the above embodiment, as the first single touch gesture and the second single touch gesture, the controller detects such gestures of a single finger drawing an arc, but the present invention is not limited thereto.

For example, in a case in which a capacitive sensing method is employed as the detection method for the touch screen 2B is, the controller 10 may detect a touched area. In this way, the controller 10 can detect, for example, an area of the touch-screen display 2 touched by a finger pad. When an area of the touch-screen display 2 is touched through the single touch gesture, such an area is hereinafter referred to as a touched area.

In this case, in a state where the touched area is at least a first area, when a gesture of moving a touched position in a first direction (for example, to the right) is performed within a predetermined period of time, the controller 10 may detect such a gesture as the first single touch gesture.

In a state where the touched area is at least the first area, when a gesture of moving the touched position in a second direction (for example, to the left) is performed within a predetermined period of time, the controller 10 may detect such a gesture as the second single touch gesture.

In a state where the touched area is at least a second area, when a flick gesture is performed within a predetermined period of time, the controller 10 may detect such a gesture as the first single touch gesture. In a state where the touched area is at least a third area larger than the second area, when a flick gesture is performed within a predetermined period of time, the controller 10 may detect such a gesture as the second single touch gesture.

In the present embodiment, the configuration of the smartphone 1 including the receiving unit 63 has been described, but the embodiment is not limited thereto. For example, in addition to receiving power from the power transmitting unit 103 by electromagnetic waves, the power receiving unit 60 may also receive electromagnetic waves for transmitting information such as identification information, at a frequency different from the electromagnetic waves for receiving power.

Similarly, the battery charger 100 may not include the wireless communication unit 101, and the power transmitting unit 103 may transmit electromagnetic waves for transmitting identification information, at a frequency different from the electromagnetic waves for receiving power.

What is claimed is:

1. An electronic device, comprising:
   a power receiving unit that receives power from a battery charger by electromagnetic waves;
   a speaker unit that outputs sound of a telephone call in a first mode as a sound output mode in a case in which the electronic device is made proximate to a user's ear, or a second mode as a sound output mode in a case in which the electronic device is separated from the user's ear;
   a determination unit that receives identification information for identifying the battery charger, and determines whether the battery charger is disposed at a predetermined place, based on the identification information;
   a conversion unit that converts sound into characters in a case in which the determination unit determines that the battery charger is disposed at a place other than the predetermined place; and
   a display unit that displays the characters converted by the conversion unit,
   wherein, in a case in which the determination unit determines that the battery charger is disposed at the predetermined place, when the power receiving unit is receiving power by the battery charger disposed at the predetermined place, the speaker unit outputs sound of the telephone call in the second mode, and
   in a case in which the power receiving unit is receiving power by the battery charger disposed at a place other than the predetermined place, the speaker unit does not output sound of the telephone call in the second mode.

2. The electronic device according to claim 1, further comprising:
   a transmitting unit that transmits data of the sound to the battery charger so as to output the sound from a second speaker disposed in the battery charger when a mode is switched to the second mode, in a case in which the second speaker is disposed in the battery charger.

3. The electronic device according to claim 1, further comprising:
   a detecting unit that detects that the electronic device is separated from the battery charger,
   wherein, in a case in which the speaker unit is outputting sound in the second mode, when the detecting unit detects that the electronic device is separated from the battery charger, the speaker unit outputs the sound in the first mode.

4. The electronic device according to claim 1, further comprising:
   a communication unit that is capable of receiving data of sound by connecting to a communication network,
   wherein the speaker unit outputs the sound based on the data of sound.

5. The electronic device according to claim 1,
   wherein the second mode is a mode, in which the speaker unit outputs sound at a volume higher than a volume in the first mode.

6. The electronic device according to claim 1,
   wherein the speaker unit includes: a receiver that is proximate to the user's ear when the electronic device is made proximate to the user's ear; and a speaker that is disposed in a position different from a position of the receiver, and
   wherein sound is output from the receiver in the first mode, and sound is output from the speaker in the second mode.

7. An electronic device, comprising:
a power receiving unit that receives power from a battery charger by electromagnetic waves;
a bone conduction unit that is abutted on an ear of a user to conduct sound to the user;
a speaker unit that outputs sound obtained from a telephone call;
a control unit that drives the bone conduction unit in a case in which the power receiving unit is not receiving power, and the speaker unit outputs sound obtained from the telephone call in a case in which the power receiving unit is receiving power;
a determination unit that receives identification information for identifying the battery charger, and determines whether the battery charger is disposed at a predetermined place, based on the identification information;
a conversion unit that converts sound into characters in a case in which the determination unit determines that the battery charger is disposed at a place other than the predetermined place; and
a display unit that displays the characters converted by the conversion unit,
wherein, in a case in which the determination unit determines that the battery charger is disposed at the predetermined place, when the power receiving unit is receiving power by the battery charger disposed at the predetermined place, the speaker unit outputs sound of the telephone call, and
in a case in which the power receiving unit is receiving power by the battery charger disposed at a place other than the predetermined place, the speaker unit does not output sound of the telephone call.

8. An electronic device, comprising:
a power receiving unit that receives power from a battery charger by electromagnetic waves;
a cartilage conduction unit that is abutted on an ear of a user to conduct sound to the user;
a speaker unit that outputs sound obtained from a telephone call;
a control unit that drives the cartilage conduction unit in a case in which the power receiving unit is not receiving power, and the speaker unit outputs sound obtained from the telephone call in a case in which the power receiving unit is receiving power;
a determination unit that receives identification information for identifying the battery charger, and determines whether the battery charger is disposed at a predetermined place, based on the identification information;
a conversion unit that converts sound into characters in a case in which the determination unit determines that the battery charger is disposed at a place other than the predetermined place; and
a display unit that displays the characters converted by the conversion unit,
wherein, in a case in which the determination unit determines that the battery charger is disposed at the predetermined place, when the power receiving unit is receiving power by the battery charger disposed at the predetermined place, the speaker unit outputs sound of the telephone call, and
in a case in which the power receiving unit is receiving power by the battery charger disposed at a place other than the predetermined place, the speaker unit does not output sound of the telephone call.

* * * * *